US012623722B2

(12) United States Patent
Rezania

(10) Patent No.: US 12,623,722 B2
(45) Date of Patent: May 12, 2026

(54) SUSPENSION UNIT HAVING CAMBER AND/OR TOE ADJUSTMENT MECHANISM FOR SUSPENDING A WHEEL AND TIRE ASSEMBLY FROM A VEHICLE FRAME

(71) Applicant: Timbren Industries, Inc., Whitby (CA)

(72) Inventor: Parto Rezania, Markham (CA)

(73) Assignee: Timbren Industries, Inc., Whitby (CA)

( * ) Notice: Subject to any disclaimer, the term of this patent is extended or adjusted under 35 U.S.C. 154(b) by 0 days.

(21) Appl. No.: 19/184,164

(22) Filed: Apr. 21, 2025

(65) Prior Publication Data

US 2025/0340241 A1 Nov. 6, 2025

Related U.S. Application Data

(60) Provisional application No. 63/642,219, filed on May 3, 2024.

(51) Int. Cl.
| | |
|---|---|
| *B62D 17/00* | (2006.01) |
| *B60B 35/04* | (2006.01) |
| *B60G 3/14* | (2006.01) |
| *B60G 11/22* | (2006.01) |

(52) U.S. Cl.
CPC .............. *B62D 17/00* (2013.01); *B60B 35/04* (2013.01); *B60G 3/14* (2013.01); *B60G 11/22* (2013.01); *B60G 2200/132* (2013.01); *B60G 2204/61* (2013.01); *B60G 2206/73* (2013.01)

(58) Field of Classification Search
CPC ........... B62D 17/00; B60G 7/02; B60B 35/04
See application file for complete search history.

(56) References Cited

U.S. PATENT DOCUMENTS

| | | | | | |
|---|---|---|---|---|---|
| 4,650,208 | A | * | 3/1987 | Mason | B62D 17/00 |
| | | | | | 280/86.757 |
| 4,991,868 | A | * | 2/1991 | VanDenberg | B60G 11/28 |
| | | | | | 280/86.75 |

(Continued)

FOREIGN PATENT DOCUMENTS

| | | | | | |
|---|---|---|---|---|---|
| CA | | 2801650 A1 | * | 7/2013 | B60G 7/02 |

*Primary Examiner* — Nicole T Verley
(74) *Attorney, Agent, or Firm* — Sisson & Banyas, Attorneys at Law, LLC; Jeffrey J. Banyas

(57) ABSTRACT

A suspension unit for suspending a wheel and tire assembly from a vehicle frame includes a hanger, a control arm, a spindle assembly, a jounce spring, a rebound spring, a camber adjustment mechanism, and a toe adjustment mechanism. The spindle assembly is connected to an upper wall top surface of the control arm at an upper wall terminal end. The jounce spring is positioned between the upper wall top surface and a top wall bottom surface of the hanger. The rebound spring is positioned between a forward wall outer surface of the control arm and a front wall inner surface of the hanger. A mounting bolt connects the control arm to the hanger. The camber adjustment mechanism is configured to change a first position of a mounting bolt first end of the mounting bolt along a y-axis relative to a second position of a mounting bolt second end along the y-axis. The toe adjustment mechanism is configured to change a third position of the mounting bolt first end or the mounting bolt second end along an x-axis relative to a fourth position of an opposing mounting bolt end along the x-axis.

18 Claims, 15 Drawing Sheets

(56)  References Cited

U.S. PATENT DOCUMENTS

| | | | | |
|---|---|---|---|---|
| 5,037,126 A * | 8/1991 | Gottschalk | B60G 9/003 | 280/124.116 |
| 5,052,711 A * | 10/1991 | Pirkey | B62D 17/00 | 280/86.753 |
| 5,080,388 A * | 1/1992 | Berry | B62D 17/00 | 280/124.136 |
| 5,201,898 A * | 4/1993 | Pierce | B62D 17/00 | 403/4 |
| 5,791,681 A * | 8/1998 | VanDenberg | B60G 11/27 | 280/124.157 |
| 6,367,826 B1 * | 4/2002 | Klais | B60G 7/02 | 280/86.751 |
| 6,471,223 B1 * | 10/2002 | Richardson | B60G 7/001 | 280/124.157 |
| 6,659,479 B1 * | 12/2003 | Raidel, II | B60G 7/02 | 280/124.16 |
| 9,315,222 B1 * | 4/2016 | Wetter | B60G 9/02 | |
| 11,285,769 B2 * | 3/2022 | Krolo | B60G 7/001 | |
| 2005/0156398 A1 * | 7/2005 | Ramsey | B60G 9/003 | 280/124.116 |
| 2006/0113741 A1 * | 6/2006 | Chalin | B60G 9/003 | 280/124.116 |
| 2006/0181043 A1 * | 8/2006 | Zebolsky | B60G 9/003 | 280/86.754 |
| 2006/0181044 A1 * | 8/2006 | Zebolsky | B60G 9/003 | 280/86.75 |
| 2007/0126263 A1 * | 6/2007 | Ramsey | B62D 33/00 | 296/203.01 |
| 2011/0068524 A1 * | 3/2011 | McCarthy | B60G 11/12 | 267/265 |
| 2012/0153589 A1 * | 6/2012 | McCarthy | B60G 11/10 | 280/86.75 |

* cited by examiner

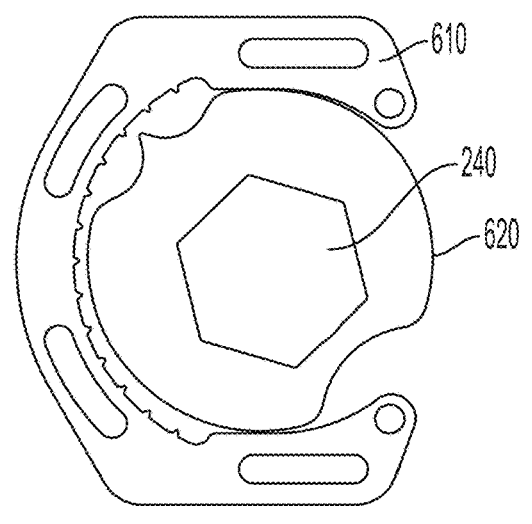
FIG. 7A
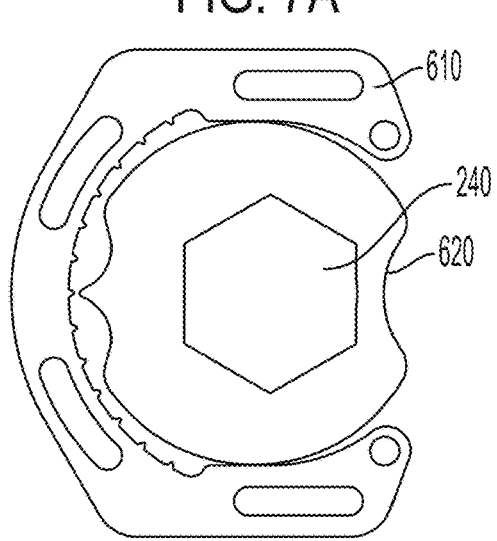
FIG. 7C
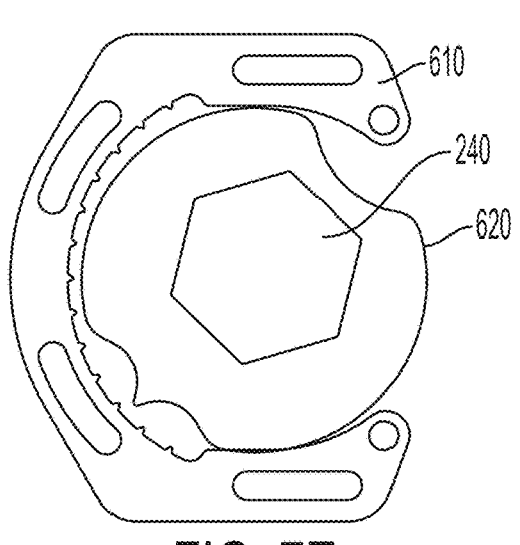
FIG. 7E
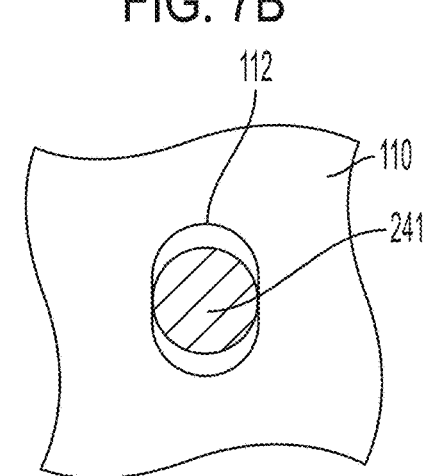
FIG. 7B
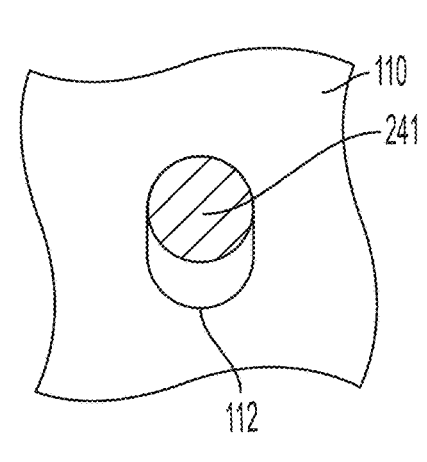
FIG. 7D
FIG. 7F

SUSPENSION UNIT HAVING CAMBER AND/OR TOE ADJUSTMENT MECHANISM FOR SUSPENDING A WHEEL AND TIRE ASSEMBLY FROM A VEHICLE FRAME

CROSS REFERENCES AND PRIORITIES

This Application claims priority from U.S. Provisional Application No. 63/642,219 filed on 3 May 2024, the teachings of which are incorporated by reference herein in their entirety.

BACKGROUND

Suspensions for vehicles, namely trailers, often include an axle which spans the distance between a wheel and tire assembly on one side of the trailer and a corresponding wheel and tire assembly on the opposing side of the trailer. In practice, these axle assemblies are often bulky, heavy, and difficult to install. In addition, trailer axles can reduce critical ground clearance which negatively impacts the ability for one to tow trailers over uneven terrain.

In recent years, axle-free suspension systems have been developed for certain trailers. One such axle-free suspension system is disclosed in U.S. Pat. No. 8,523,208 B2—the teachings of which are incorporated by reference herein in their entirety—which discloses an independent suspension with no axle which includes a hanger and a control arm having opposite first and second ends pivotally mounted to the hanger between the first and second ends. The suspension unit further includes a spindle arm mounted to the first end of the control arm. The suspension unit also includes a jounce spring on the control arm and a rebound spring mounted between the control arm and the hanger. The control arm and hanger are configured such that when the first end of the control arm pivots towards the frame of the vehicle the jounce spring is compressed and the rebound spring is relaxed and when the first end of the control arm moves away from the frame the jounce spring is relaxed and the rebound spring is compressed.

In practice, such axle-free suspension systems require precision manufacturing and installation to ensure proper alignment of the wheel and tire assembly including camber and toe. Camber referring to the tilt angle between the vertical axis of the wheel and the vertical axis of the vehicle when viewed from the front or rear. Toe—sometimes referred to as tracking—referring to the angle that the wheel makes with the longitudinal axis of the vehicle when viewed from above. Once the axle-free suspension system is connected to the frame of the trailer, camber and toe cannot be adjusted without removing the axle-free suspension system—or a portion thereof—from the frame. Spacers or shims are inserted at various mounting points before reassembling the axle-free suspension system and measuring the change in alignment. If alignment issues remain, this labor intensive process is repeated until such time that satisfactory alignment is achieved.

The need exists, therefore, for an improved system and device for adjusting the alignment—including camber and/ or toe—of an axle-free suspension system.

SUMMARY

Disclosed herein is a suspension unit for suspending a wheel and tire assembly from a vehicle frame. The suspension unit including a hanger, a control arm, a spindle assembly, a jounce spring, a rebound spring, a camber adjustment mechanism, and a toe adjustment mechanism.

The hanger including an outboard plate comprising a first control arm connecting hole, an inner plate comprising a second control arm connection hole, a top wall connecting between an outboard plate upper edge and an inboard plate upper edge, and a front wall connecting between an outboard plate leading edge and an inboard plate leading edge. The control arm having a forward wall connected to an upper wall with a mounting stud connected to an upper wall proximal end. The spindle assembly connected to an upper wall top surface at an upper wall terminal end. The jounce spring positioned between the upper wall top surface and a top wall bottom surface. The rebound spring positioned between a forward wall outer surface and a front wall inner surface.

A mounting bolt connects the control arm to the hanger by passing through the first control arm connecting hole, the mounting stud, and the second control arm connecting hole. The camber adjustment mechanism is configured to change a first position of a mounting bolt first end along a y-axis relative to a second potion of a mounting bolt second end along the y-axis. The toe adjustment mechanism is configured to change a third potion of the mounting bolt first end or the mounting bolt second end along an x-axis relative to a fourth position of an opposing mounting bolt end along the x-axis.

In some embodiments, the camber adjustment mechanism may include a guide plate and a profile disk. The guide plate—when present—may have a C-shaped profile, and may be attached to an outboard plate exterior surface or an inboard plate exterior surface. When the guide plate is connected to the outboard plate exterior surface the first control arm connecting hole may be located within a C-shaped profile interior. When the guide plate is connected to the inboard plate exterior surface the second control arm connecting hole may be located within the C-shaped profile interior. When present, the profile disk may be located within the C-shaped profile interior and may include a disk through hole offset from a disk central axis. When the guide plate is attached to the outboard plate exterior surface, the first control arm connecting hole may have a first vertically oriented discorectangle shape. When the guide plate is attached to the inboard plate exterior surface the second control arm connecting hole may have a second vertically oriented discorectangle shape. In such embodiments, the mounting bolt may pass through the disk through hole.

In certain embodiments, the toe adjustment mechanism may comprise a perimeter plate and a cam plate. The perimeter plate—when present—may have a U-shaped profile, and may be attached to an outboard plate exterior surface or an inboard plate exterior surface. When the perimeter plate is connected to the outboard plate exterior surface, the first control arm connecting hole may be located within a U-shaped profile interior. When the perimeter plate is connected to the inboard plate exterior surface, the second control arm connecting hole may be located within the U-shaped profile interior. When present, the cam plate may be located within the U-shaped profile interior and may include a plate through hole offset from a plate central axis. The cam plate may also include a pin extending from a plate bottom surface. In such embodiments, the mounting bolt may pass through the plate through hole. When the perimeter plate is attached to the outboard plate exterior surface the first control arm connecting hole may have a first horizontally oriented discorectangle shape, and the outboard plate may include a first curved slot through which the pin passes. When the perimeter plate is attached to the inboard plate exterior surface, the second control arm connecting hole may have a second horizontally oriented discorectangle shape, and the inboard plate may include a second curved slot through which the pin passes.

In some embodiments, the jounce spring may be made of a first elastomeric polymer material. In certain embodiments, the rebound spring may be made of a second elastomeric polymer material. The control arm and the hanger may be configured such that the jounce spring and the rebound spring are compressed and relaxed simultaneously in substantially opposite directions. In some embodiments, the jounce spring may be preloaded such that the jounce spring is under compression when the control arm is at rest. In certain embodiments, the rebound spring may be preloaded such that the rebound spring is under compression when the control arm is at rest.

Also disclosed herein is a camber adjustment mechanism for a suspension unit for suspending a wheel and tire assembly from a vehicle frame. The camber adjustment mechanism includes a guide plate and a profile disk. The guide plate having a C-shaped profile. The profile disk configured to locate within a C-shaped profile interior and including a disk through hole offset from a disk central axis and configured to receive a mounting bolt. The mounting bolt being configured to connect a control arm of the suspension unit to a hanger of the suspension unit.

Further disclosed herein is a toe adjustment mechanism for a suspension unit for suspending a wheel and tire assembly from a vehicle frame. The toe adjustment mechanism includes a perimeter plate and a cam plate. The perimeter plate having a U-shaped profile. The cam plate configured to locate within a U-shaped profile interior and having a plate through hole offset from a plate central axis. The cam plate also including a pin extending from a plate bottom surface. The plate through hole being configured to receive a mounting bolt which is configured to connect a control arm of the suspension unit to a hanger of the suspension unit.

BRIEF DESCRIPTION OF FIGURES

FIG. 7A is a front view of a profile disk within a guide plate in a first position.

FIG. 7B is a view of a mounting bolt within a first control arm connecting hole of an outboard plate of a hanger when a profile disk is within a guide plate in the first position.

FIG. 7C is a front view of a profile disk within a guide plate in a second position.

FIG. 7D is a view of a mounting bolt within a first control arm connecting hole of an outboard plate of a hanger when a profile disk is within a guide plate in the second position.

FIG. 7E is a front view of a profile disk within a guide plate in a third position.

FIG. 7F is a view of a mounting bolt within a first control arm connecting hole of an outboard plate of a hanger when a profile disk is within a guide plate in the third position.

DETAILED DESCRIPTION

Disclosed herein is a suspension unit for suspending a wheel and tire assembly from a vehicle frame. The suspension unit is described below with reference to the Figures. As described herein, the following numbers refer to the following structures as noted in the Figures.

10 refers to a suspension unit.

20 refers to a wheel and tire assembly.

100 refers to a hanger.

110 refers to an outboard plate.

112 refers to a first control arm connecting hole.

13 refers to a first control arm connecting hole central axis.

114 refers to an outboard plate upper edge.

116 refers to an outboard plate leading edge.
118 refers to an outboard plate exterior surface.
120 refers to an inboard plate.
122 refers to a second control arm connecting hole.
123 refers to a second control arm connecting hole central axis.
124 refers to an inboard plate upper edge.
126 refers to an inboard plate leading edge.
128 refers to an inboard plate exterior surface.
129 refers to a curved slot.
130 refers to a top wall.
132 refers to a top wall bottom surface.
140 refers to a front wall.
142 refers to a front wall inner surface.
200 refers to a control arm.
210 refers to a forward wall.
220 refers to an upper wall.
222 refers to an upper wall proximal end.
224 refers to an upper wall top surface.
226 refers to an upper wall terminal end.
230 refers to a mounting stud.
240 refers to a mounting bolt.
241 refers to a mounting bolt first end.
242 refers to a mounting bolt second end.
250 refers to a y-axis.
260 refers to an x-axis.
270 refers to a z-axis.
300 refers to a spindle assembly.
310 refers to a spindle arm.
320 refers to a spindle mounting base
400 refers to a jounce spring.
500 refers to a rebound spring.
600 refers to a camber adjustment mechanism.
610 refers to a guide plate.
611 refers to a C-shaped profile.
612 refers to a C-shaped profile interior.
613 refers to guide plate teeth.
620 refers to a profile disk.
622 refers to a disk through hole.
624 refers to a disk central axis.
700 refers to a toe adjustment mechanism.
710 refers to a perimeter plate.
711 refers to a U-shaped profile.
712 refers to a U-shaped profile interior.
713 refers to perimeter plate teeth.
720 refers to a cam plate.
722 refers to a plate through hole.
724 refers to a plate central axis.
726 refers to a pin.
728 refers to a plate bottom surface.

Figures 1, 2:
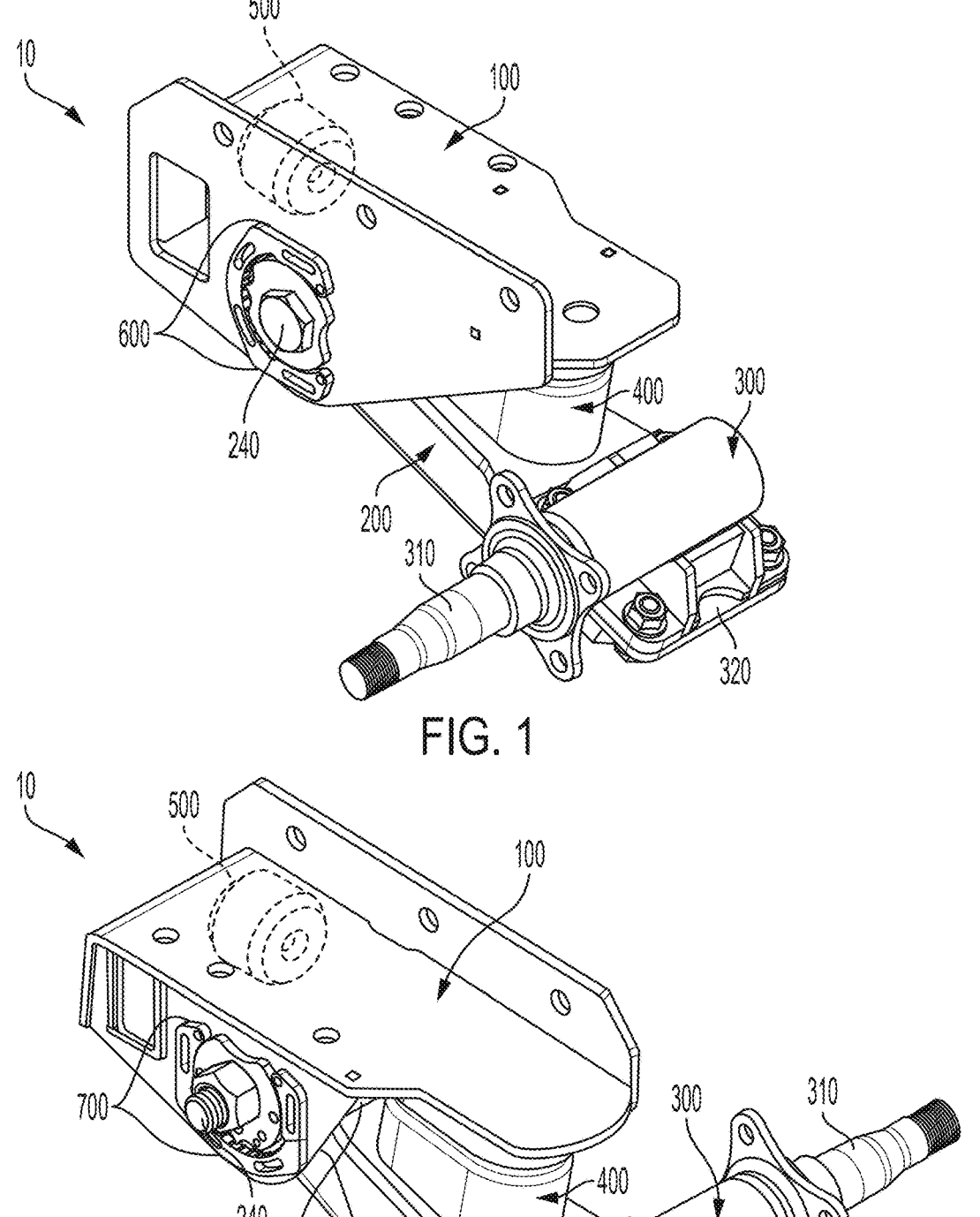
FIG. 1 is a perspective view of a suspension unit for suspending a wheel and tire assembly from a vehicle frame viewed from the outboard side.
FIG. 2 is a perspective view of a suspension unit for suspending a wheel and tire assembly from a vehicle frame viewed from the inboard side.
Figure 3:
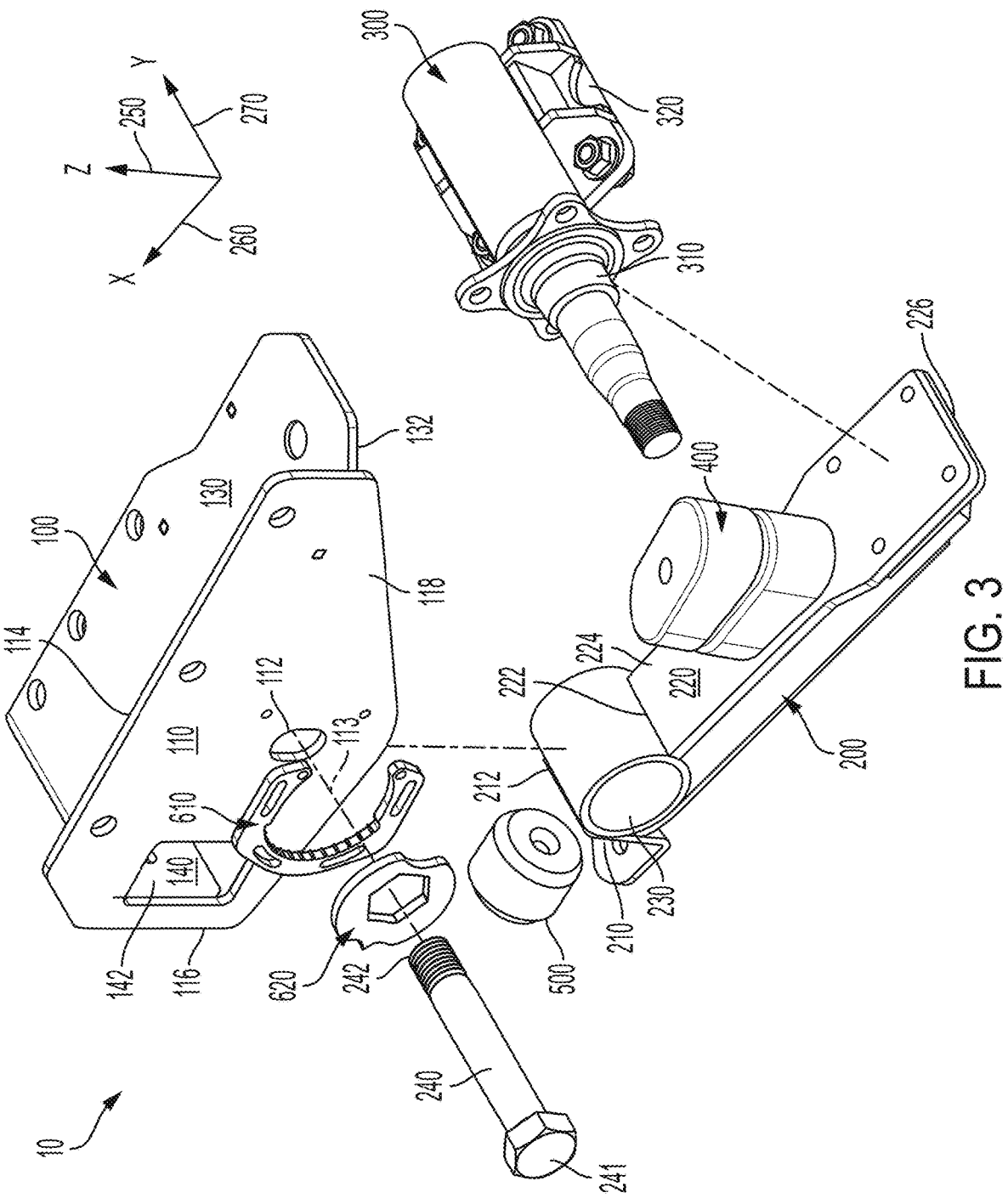
FIG. 3 is a partially exploded view of a suspension unit having a camber adjustment mechanism.

FIG. 1 and FIG. 2 illustrate a suspension unit (10) for suspending a wheel and tire assembly ((20 as shown in FIGS. 8B, 9B, 15B, and 16B) from a vehicle frame. As shown in FIG. 1 and FIG. 2, the suspension unit (10) includes a hanger (100), a control arm (200), a spindle assembly (300), a jounce spring (400), and a rebound spring (500). FIG. 1, which illustrates the suspension unit from an outboard side, also shows the suspension unit including a camber adjustment mechanism (600) inclusive of a guide plate ((610) as shown in FIG. 3) and a profile disk ((620) as shown in FIG. 3). FIG. 2, which illustrates the suspension unit from an inboard side, also shows the suspension unit including a toe adjustment mechanism (700) inclusive of a perimeter plate ((710) as shown in FIG. 10) and a cam plate ((720) as shown in FIG. 10).

While FIG. 1 and FIG. 2 illustrate the suspension unit (10) having both a camber adjustment mechanism (600) and a toe adjustment mechanism (700) with the camber adjustment mechanism located on the outboard side of the suspension unit (as shown in FIG. 1) and the toe adjustment mechanism located on the inboard side of the suspension unit (as shown in FIG. 2), other embodiments may exist. For example, the suspension unit may include only a camber adjustment mechanism which may be located on either the outboard side or the inboard side of the suspension unit. Alternatively, the suspension unit may include only a toe adjustment mechanism which may be located on either the outboard side of the suspension unit or the inboard side of the suspension unit. As a further alternative, the suspension unit may include a camber adjustment mechanism located on the inboard side of the suspension unit and a toe adjustment mechanism located on the outboard side of the suspension unit. In another alternative, the suspension unit may include a camber adjustment mechanism and a toe adjustment mechanism, both of which may be located on the outboard side of the suspension unit, or both of which may be located on the inboard side of the suspension unit.

FIG. 3 illustrates the suspension unit (10) in exploded perspective from the outboard side showing additional features of the hanger (100), control arm (200), and an exemplary embodiment of a camber adjustment mechanism (600). FIG. 3 also illustrates a mounting bolt (240) for connecting the hanger to the control arm, the spindle assembly (300), the jounce spring (400), and the rebound spring (500).

Figure 10:
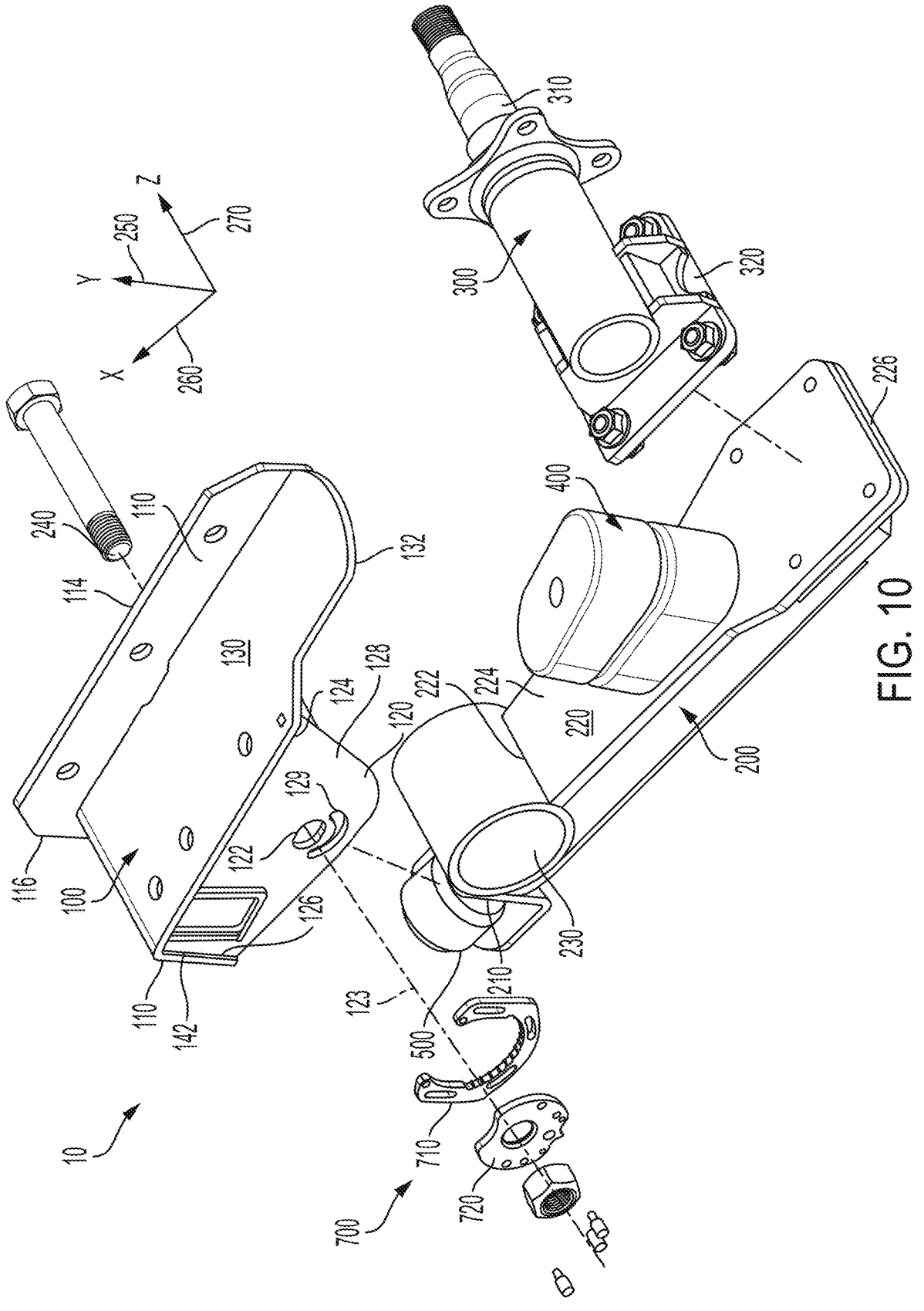
FIG. 10 is a partially exploded view of a suspension unit showing a toe adjustment mechanism.

As shown in FIG. 3, the hanger (100) includes an outboard plate (110), an inboard plate ((120) as shown in FIG. 10), a top wall (130), and a front wall (140). The outboard plate includes a first control arm connecting hole (112) passing through the outboard plate. Similarly, the inboard plate includes a second control arm connecting hole ((122) as shown in FIG. 10) passing through the inboard plate. Preferably, the first control arm connecting hole will be aligned with the second control arm connecting hole in such a manner as to allow the mounting bolt (240) to pass through both the first control arm connecting hole and the second control arm connecting hole when connecting the control arm (200) to the hanger.

The top wall (130) of the hanger (100) connects between an outboard plate upper edge (114) of the outboard plate (110) and an inboard plate upper edge ((124) as shown in FIG. 10) of the inboard plate ((120) as shown in FIG. 10). When the suspension unit (10) is assembled as shown in FIG. 1 and FIG. 2, the top wall bottom surface (132) provides a surface against which one end of the jounce spring (400) is positioned.

The front wall (140) of the hanger (100) connects between an outboard plate leading edge (116) of the outboard plate (110) and an inboard plate leading edge ((126) as shown in FIG. 10) of the inboard plate ((120) as shown in FIG. 10). When the suspension unit (10) is assembled as shown in FIG. 1 and FIG. 2, the front wall inner surface (142) of the front wall provides a surface against which one end of the rebound spring (500) is positioned.

As further shown in FIG. 3, the control arm (200) includes a forward wall (210) connected to an upper wall (220). The upper wall includes an upper wall proximal end (222) and an upper wall terminal end (226). Connected to the upper wall proximal end at or about a juncture with the forward wall is a mounting stud (230) through which the mounting bolt (240) passes to connect the hanger (100) to the control arm as shown in FIG. 1 and FIG. 2. In some embodiments, the interior of the mounting stud may include a bushing (not shown).

FIG. 3 also illustrates the spindle assembly (300). As shown in FIG. 3, the spindle assembly may include a spindle arm (310) for mounting to a wheel and tire assembly ((20) as shown in FIG. 8B, FIG. 9B, FIG. 15B, and FIG. 16B) and a spindle mounting base (320) which connects the spindle assembly to the control arm (200). When assembled as shown in FIG. 1 and FIG. 2, the spindle assembly is connected to an upper wall top surface (224) of the upper wall (220) at the upper wall terminal end (226). The connection between the spindle assembly and the upper wall top surface may take many forms. Preferably, the connection will be a removable connection comprising a plurality of bolts and nuts or similar fasteners. However, in some embodiments, the connection may be a permanent connection such as welding the spindle assembly to the upper wall top surface or manufacturing the upper wall and the spindle assembly of a single integral piece of material.

It is possible to adjust the ride height of the vehicle by simply replacing the spindle assembly (300). For example, a spindle assembly having a spindle arm (310) which is at substantially the same level as the spindle mounting base (320) may be used to obtain a more or less normal or standard ride height of the vehicle. By replacing the spindle assembly with one having a spindle arm which is at a higher level than the spindle mounting base, the ride height of the vehicle may be lowered. Conversely, by replacing the spindle assembly with one having a spindle arm which is at a lower level than the spindle mounting base, the ride height of the vehicle may be raised.

When assembled as shown in FIG. 1 and FIG. 2, the upper wall top surface (224) provides a surface against which one end of the jounce spring (400)—specifically the end opposite the jounce spring end that is positioned against the top wall bottom surface (132)—may be positioned. Further, the forward wall outer surface ((212) shown in FIG. 3) provides a surface against which one end of the rebound spring (500)—specifically the end opposite the rebound spring end that is positioned against the front wall inner surface (142)—may be positioned. During operation, the jounce spring and rebound spring function together, though they compress and relax simultaneously in opposite directions.

The jounce spring (400) will preferably be made from a first elastomeric polymer material. Similarly, the rebound spring (500) may be made from a second elastomeric polymer material. Examples of such elastomeric material which may be utilized for either or both of the jounce spring and/or the rebound spring include natural rubbers and synthetic rubbers.

The jounce spring (400) will preferably be in the form of a largely solid block of elastomeric polymer material which is slightly tapered. In some embodiments, the jounce spring may include protruding pins configured to pass through holes in the upper wall top surface (224) and/or the top wall bottom surface (132) for mounting the jounce spring without the need for additional hardware. Alternatively, the jounce spring may include one or more apertures that allow the jounce spring to be held in place to the hanger (100) and/or the control arm (200) by way of short mounting bolts or related fasteners such as screws, rivets, or clamps.

The rebound spring (500) will preferably be in the form of a cylindrical elastomeric polymer member. In some embodiments, the rebound spring may included molded-in threaded bushings on opposing flat surfaces. The threaded bushings may serve as a mounting device for connecting the rebound spring to the hanger (100) and/or the control arm (200). Alternatively, the rebound spring may include one or more apertures that allow the rebound spring to be held in place to the hanger and/or the control arm by way of short mounting bolts or related fasteners such as screws, rivets, or clamps.

Preferably one—and more preferably both—of the jounce spring (400) and the rebound spring (500) will be partially preloaded when the suspension is in a fully relaxed position (or when there is no external load on the suspension)—sometimes referred to as the control arm being at rest. Likewise, both springs are preferably both in contact and never get fully relaxed in a fully loaded position of the control arm regardless of the position of the control arm.

Control arm (200), hanger (100), and jounce spring (400) may all be positioned such that the direction of compression and relaxation of jounce spring is substantially vertical. In contrast, control arm, hanger, and rebound spring (500) may all be positioned so that the compression and relaxation of the rebound spring counteracts those of the jounce spring.

FIG. 3 also illustrates the mounting bolt (240). As shown in FIG. 3, the mounting bolt includes a mounting bolt first end (241) and a mounting bolt second end (242). To connect the hanger (100) to the control arm (200), the mounting stud (230) is first placed into an interior channel between the outboard plate (110) and the inboard plate ((120) as shown in FIG. 10) of the hanger and aligned between the first control arm connecting hole (112) and the second control arm connecting hole ((122) as shown in FIG. 10). The mounting bolt second end then passes into and through the first control arm connecting hole, the mounting stud, and the second control arm connecting hole before a nut is threaded onto the mounting bolt second end.

Figure 8A:
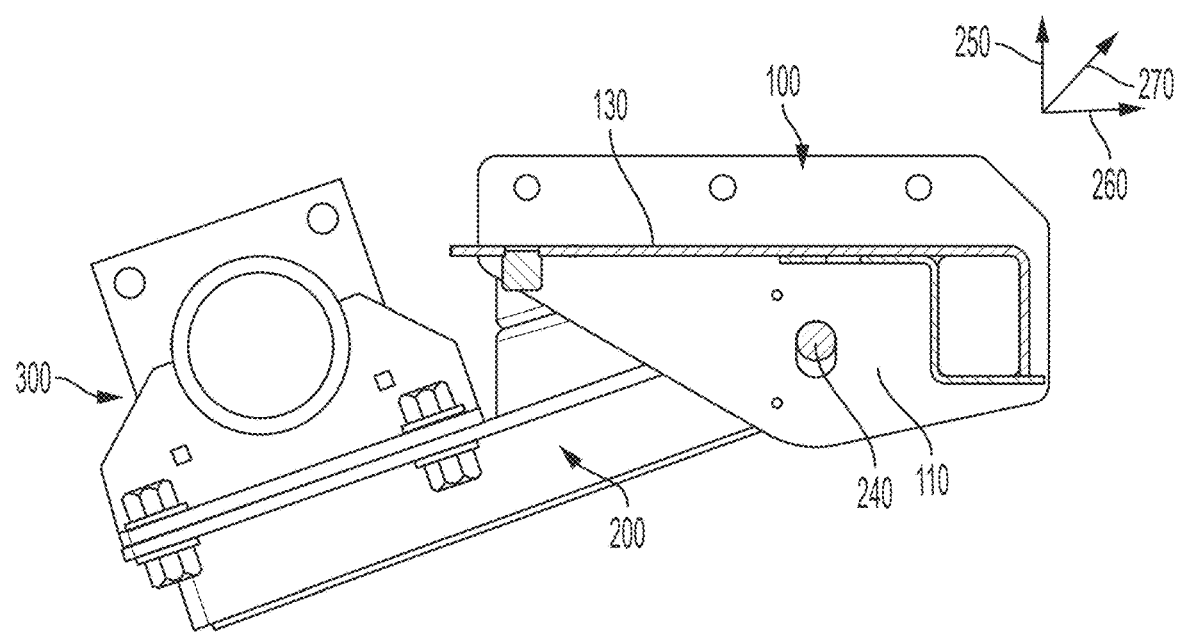
FIG. 8A is a cross section view of a camber adjustment mechanism connected to a suspension unit in a second position of camber adjustment.
Figure 8B:
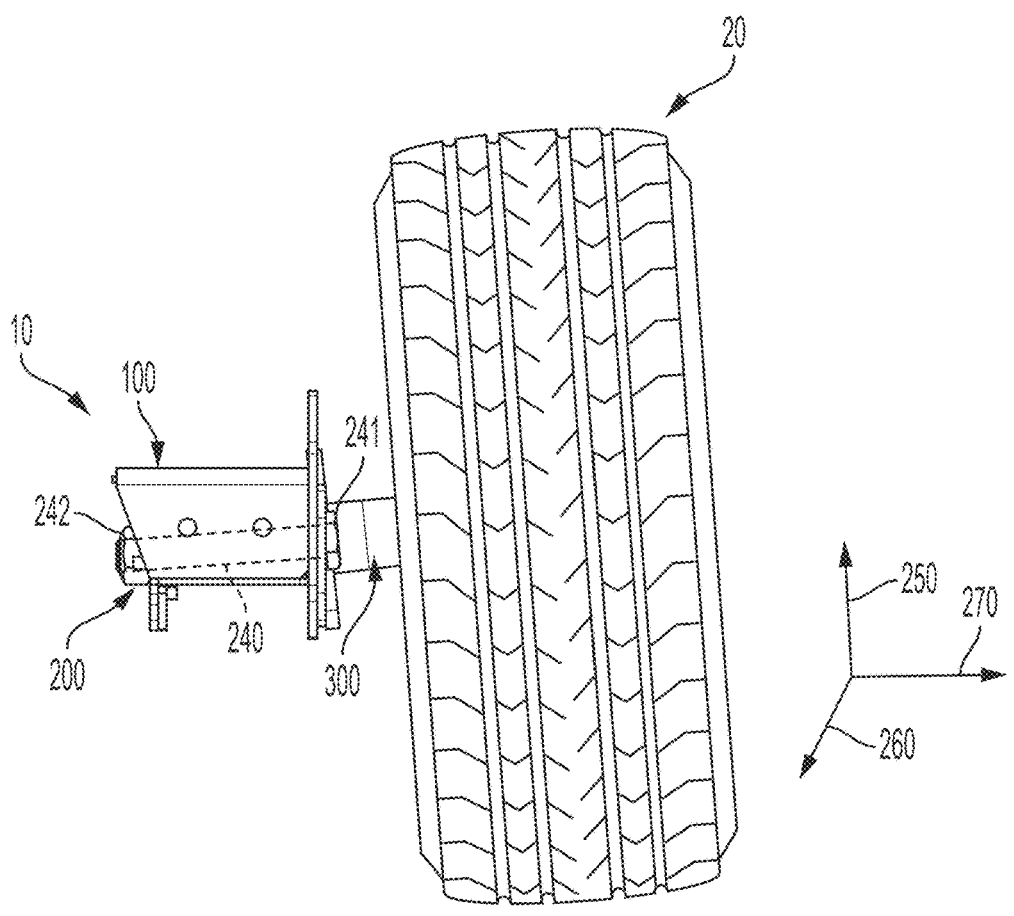
FIG. 8B is a rear view of a wheel and tire assembly in the second position of camber adjustment.
Figure 9A:
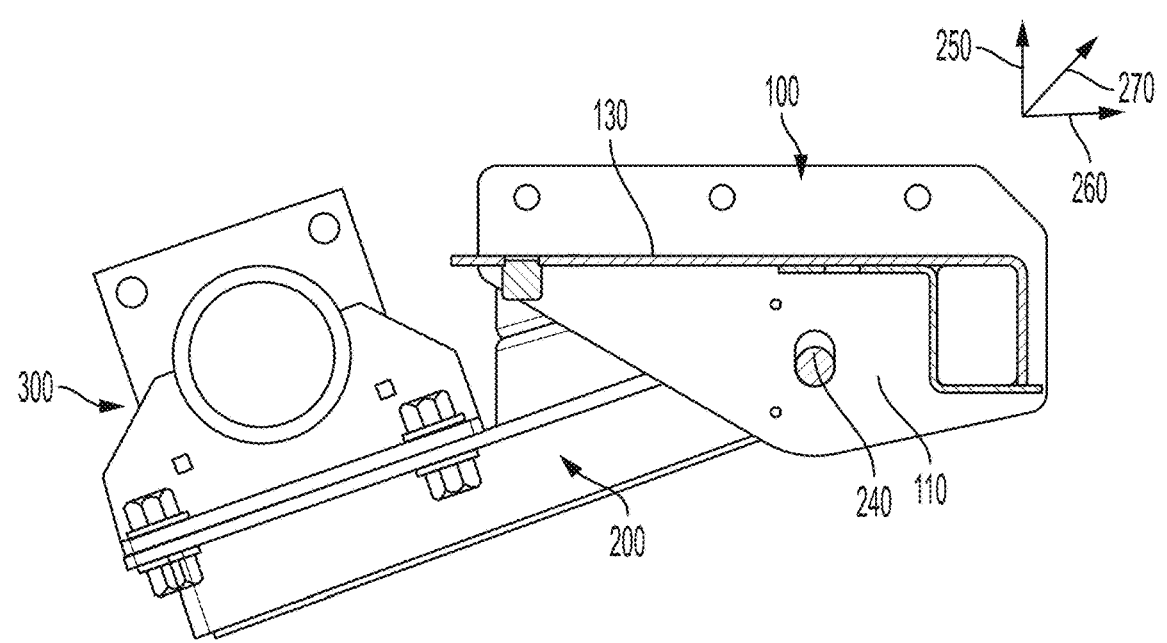
FIG. 9A is a cross section view of a camber adjustment mechanism connected to a suspension unit in a first position of camber adjustment.
Figure 9B:
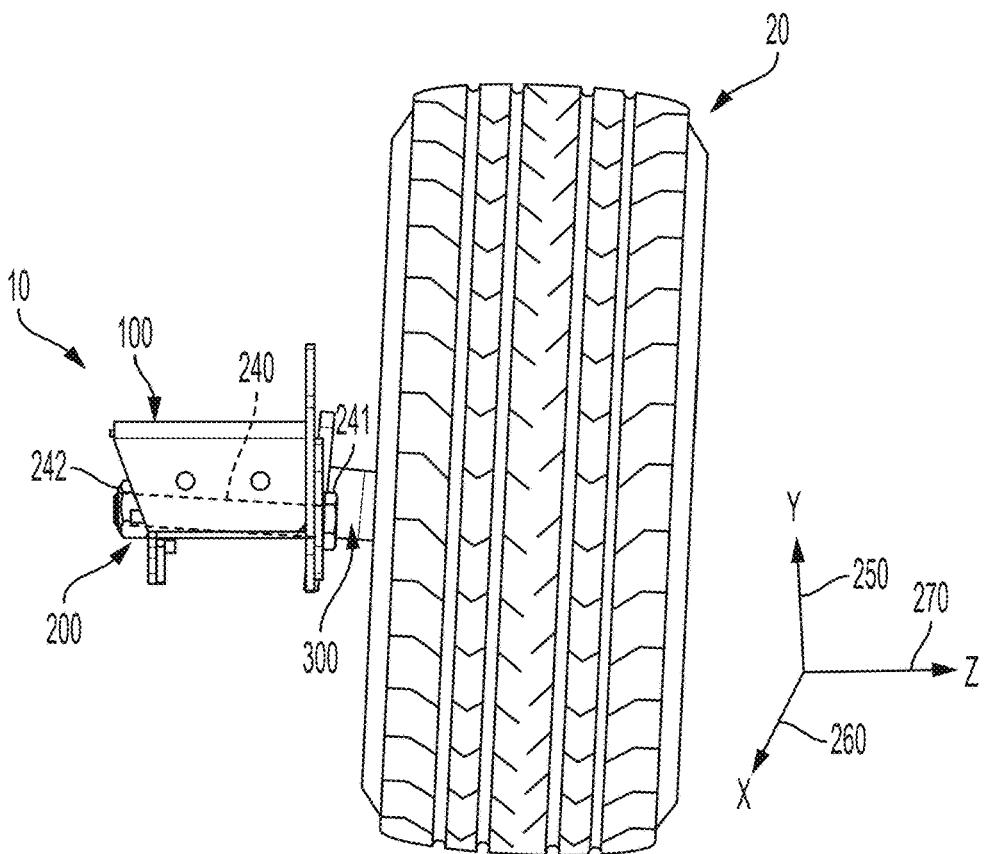
FIG. 9B is a rear view of a wheel and tire assembly in the first position of camber adjustment.

The camber adjustment mechanism (600)—when present—is configured to change a first position of the mounting bolt first end (241) along a z-axis (250) relative to a second position of the mounting bolt second end along the z-axis. Doing so rotates the control arm about the y-axis (270) in the direction of the x-axis (260) which in turn acts upon the spindle assembly (300) to change the camber of the wheel and tire assembly ((20) as shown in FIGS. 8B and 9B) as further described herein.

The camber adjustment mechanism (600) may take many forms, an exemplary embodiment of which is illustrated in FIGS. 3 through 6. As shown in the Figures, the exemplary embodiment of a camber adjustment mechanism may include a guide plate (610) and a profile disk (620).

Figure 4:
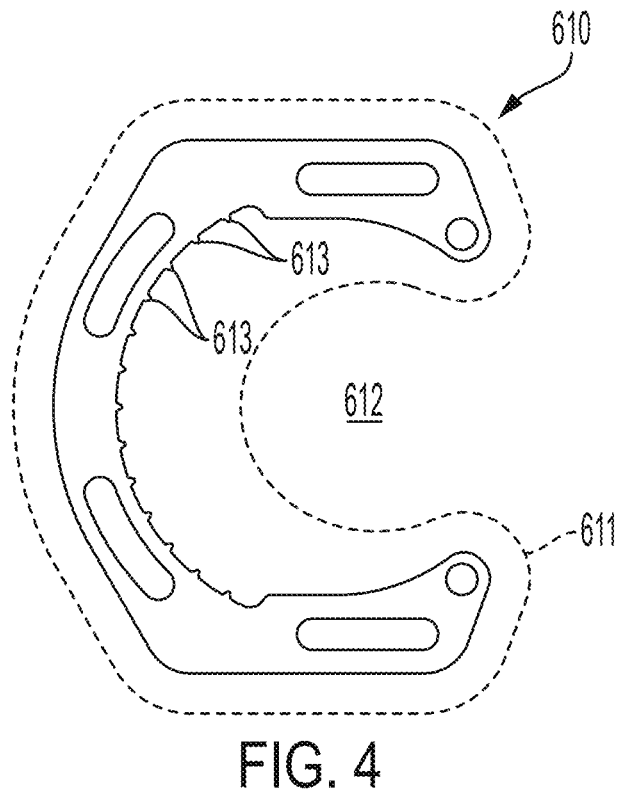
FIG. 4 is a front view of a guide plate for a camber adjustment mechanism.

FIG. 4 illustrates a front view of an exemplary embodiment of a guide plate (610) for a camber adjustment mechanism (600). As shown in FIG. 4, the guide plate may have a C-shaped profile (611).

Figure 5:
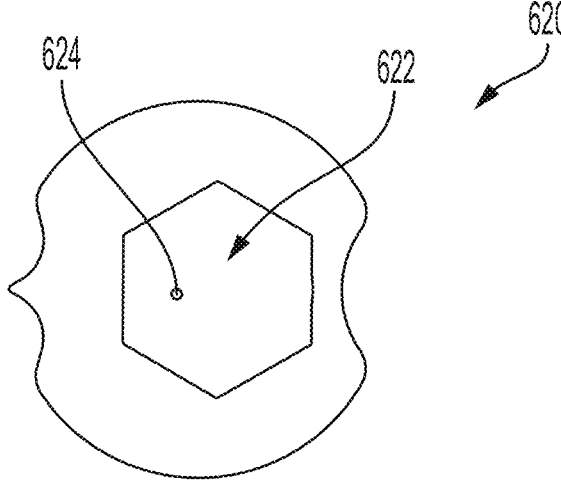
FIG. 5 is a front view of a profile disk for a camber adjustment mechanism.

FIG. 5 illustrates a front view of an exemplary embodiment of a profile disk (620). As shown in FIG. 5, the profile disk includes a disk through hole (622). Preferably, the disk through hole will be offset from a disk central axis (624) to allow a cammed movement of the profile disk within the C-shaped profile interior (612) to adjust the camber of the wheel and tire assembly (20) as described herein.

The cammed movement of the profile disk (620) within the C-shaped profile interior (612) differs from traditional cam and follower systems. Traditional cam and follower systems include a follower which slides on the outer edge of the cam and moves relative to the center as the cam rotates. In the devices described herein, the follower has been replaced with the guide plate (610) which does not move relative to the hanger (100). Instead, the profile disk "floats" within the C-shaped profile interior of the guide plate and—in doing so—moves its own instantaneous center of rotation. The center moves exclusively along the line that connects the front and back (or top and bottom) points of contact with the guide plate.

Figure 6:
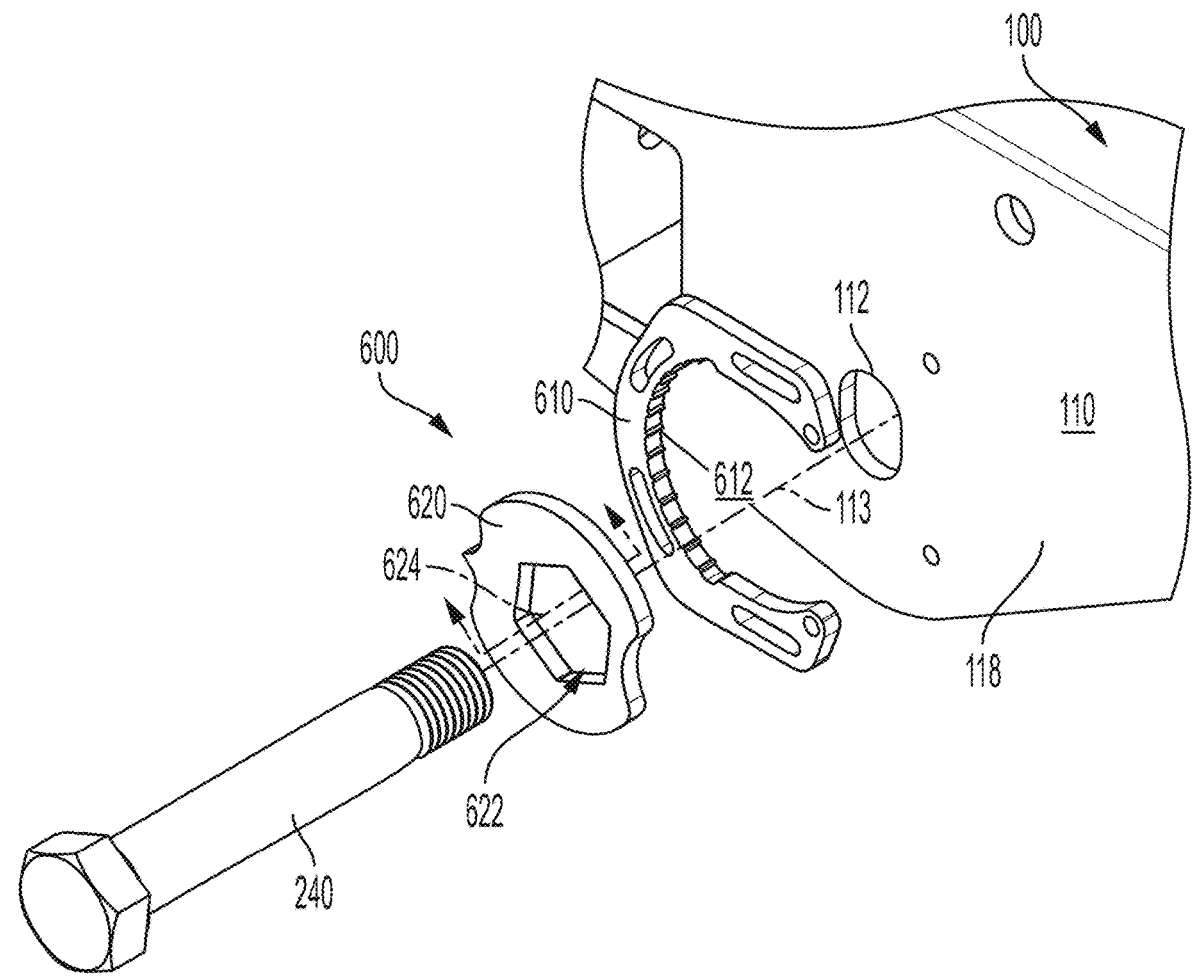
FIG. 6 is an exploded close-up view of a camber adjustment mechanism.

FIG. 6 illustrates an exploded perspective view of the camber adjustment mechanism (600) connecting to the hanger (100). As shown in FIG. 6, the camber adjustment mechanism is connected to the outboard plate (110) of the hanger. However, one of ordinary skill can easily envision where the camber adjustment mechanism can be—instead—connected to the inboard plate ((120) as shown in FIG. 10) of the hanger—with or without the toe adjustment mechanism (700)—instead.

As shown in FIG. 6, in the exemplary embodiment of a camber adjustment mechanism (600), the guide plate (610) may be attached to the outboard plate exterior surface (118) of the outboard plate (110) of the hanger (100). Preferably, when doing so, the first control arm connecting hole (112) will be located within a C-shaped profile interior (612). The interior of the guide plate may feature multiple teeth ((613) as shown in FIG. 4) extending from the base along the curved surface towards the center as depicted in FIG. 6. Once calibrated, the nearest tooth to the arrow point of the profile disk (620) can readily indicate the degree of alignment. The attachment of the guide plate to the outboard plate exterior surface may take many forms. For example, the guide plate may be removably connected to the outboard plate exterior surface by one or more fasteners such as a bolt, screw, rivet, or the like. Alternatively, the guide plate may be permanently connected to the outboard plate exterior surface such as by welding the guide plate to the outboard plate exterior surface or manufacturing the guide plate and the outboard plate of a single integral piece of material.

Once the guide plate (610) is attached to the outboard plate exterior surface (118) of the outboard plate (110) of the hanger (100), the profile disk (620) may be placed within the C-shaped profile interior (612). The mounting bolt (240) then passes through the disk through hole (622) before passing into and through the first control arm connecting hole (112). In the exemplary embodiment shown in FIG. 6, the first control arm connecting hole has a first vertically oriented discorectangle shape (or "slot") allowing for the mounting bolt first end (241) to move along the z-axis ((250) as shown in FIG. 8A and FIG. 9A)) relative to the mounting bolt second end (242) to adjust the camber of the wheel and tire assembly (20) as further described herein. When the camber adjustment mechanism (600) is attached to the inboard plate exterior surface ((128) as shown in FIG. 10), it will be the second control arm connecting hole (122) that has a second vertically oriented discorectangle shape (or "slot") allowing for the mounting bolt second end to move along the y-axis relative to the mounting bolt first end to adjust the camber of the wheel and tire assembly as further described herein.

FIG. 7A through FIG. 7F illustrate the cammed motion of the profile disk (620) within the guide plate (610) to change the position of the mounting bolt first end (241) along the z-axis ((250) as shown in FIG. 8A and FIG. 9A). As shown in FIG. 7A and FIG. 7B, when the mounting bolt is loosened and the profile disk is rotated clockwise, the mounting bolt first end (241) moves downward within the first control arm connecting hole (112) placing the wheel and tire assembly in a position of positive camber as shown in FIG. 9B. In FIG. 7C and 7D, the mounting bolt is loosened and the profile disk is rotated counterclockwise to a neutral position causing the mounting bolt first end to move to a central location within the first control arm connecting hole and placing the wheel and tire assembly in a position of neutral camber. In FIG. 7E and FIG. 7F, the mounting bolt is loosened and the profile disk is rotated further counterclockwise causing the mounting bolt first end to move to an upper location within the first control arm connecting hole and placing the wheel and tire assembly in a position of negative camber as shown in FIG. 8B.

FIG. 8A through FIG. 9B illustrate how the exemplary embodiment of the camber adjustment mechanism (600) operates to adjust the camber of a wheel and tire assembly (20). FIG. 8A and FIG. 9A illustrate cross section views of the suspension unit (10) facing the inner surface of the outboard plate (110) in two different positions which correspond to two different positions of camber adjustment. FIG. 8B and FIG. 9B illustrate rear views of the suspension unit connected to a vehicle frame with the wheel and tire assembly (20) connected to the spindle assembly (300).

In FIG. 8A and FIG. 8B, the mounting bolt (240) has been loosened, and the profile disk ((620) as shown in FIG. 6) has been rotated about the disk central axis ((624) as shown in FIG. 6) until the disk through hole ((622) as shown in FIG. 6) is in an upper position before tightening the mounting bolt. In doing so, the mounting bolt first end (241) moves upward along the z-axis (250) within the first control arm connecting hole (112) having the vertically oriented discorectangle shape (or "slot") while the mounting bolt second end (242) remains in largely its original position along the z-axis. This causes the upper wall ((220) as shown in FIG. 3) of the control arm (200) to rotate about the y-axis (270) in the direction of the x-axis (260) within the interior channel between the outboard plate (110) and the inboard plate ((120) as shown in FIG. 10) of the hanger (100). The rotation of the upper wall transfers through to the spindle assembly (300)—which is mounted to the upper wall top surface ((224) as shown in FIG. 3) at the upper wall proximal end ((222) as shown in FIG. 3)—which acts upon the wheel and tire assembly (20) to place the wheel and tire assembly in a position of negative camber as shown in FIG. 8B.

In FIG. 9A and FIG. 9B, the mounting bolt (240) has been loosened, and the profile disk ((620) as shown in FIG. 6) has been rotated about the disk central axis ((624) as shown in FIG. 6) until the disk through hole ((622) as shown in FIG. 6) is in a lower position before tightening the mounting bolt. In doing so, the mounting bolt first end (241) moves downwardly along the z-axis (250) within the first control arm connecting hole (112) having the vertically oriented discorectangle shape (or "slot") while the mounting bolt second end (242) remains in largely its original position along the z-axis. This causes the upper wall ((220) as shown in FIG. 3) of the control arm (200) to rotate about the y-axis (270) in the direction of the x-axis (260) within the interior channel between the outboard plate (110) and the inboard plate ((120) as shown in FIG. 10) of the hanger. The rotation of the upper wall transfers through to the spindle assembly (300)—which is mounted to the upper wall top surface (224) at the upper wall proximal end ((222) as shown in FIG. 3)—which acts upon the wheel and tire assembly (20) to place the wheel and tire assembly in a position of positive camber as shown in FIG. 9B.

While FIGS. 8A through 9B show the exemplary embodiment of the camber adjustment mechanism (600) moving the wheel and tire assembly (20) between a position of negative camber (as shown in FIGS. 8A and 8B) and positive camber (as shown in FIGS. 9A and 9B), the camber adjustment mechanism allows for any number of different camber adjustment positions including negative camber, neutral camber, and positive camber. The amount of camber adjustment permitted will largely depend upon the size and shape of the first control arm connecting hole (112), the C-shaped profile interior (612) of the guide plate (610), and the profile disk (620) as well as the location of the disk through hole (622) relative to the disk central axis (624) and the length and diameter of the mounting bolt (240).

FIG. 10 illustrates the suspension unit (10) in exploded perspective from the interior side showing additional features of an exemplary embodiment of a toe adjustment mechanism (700). As shown in FIG. 10, the toe adjustment mechanism may include a perimeter plate (710) and a cam plate (720).

Figure 11:
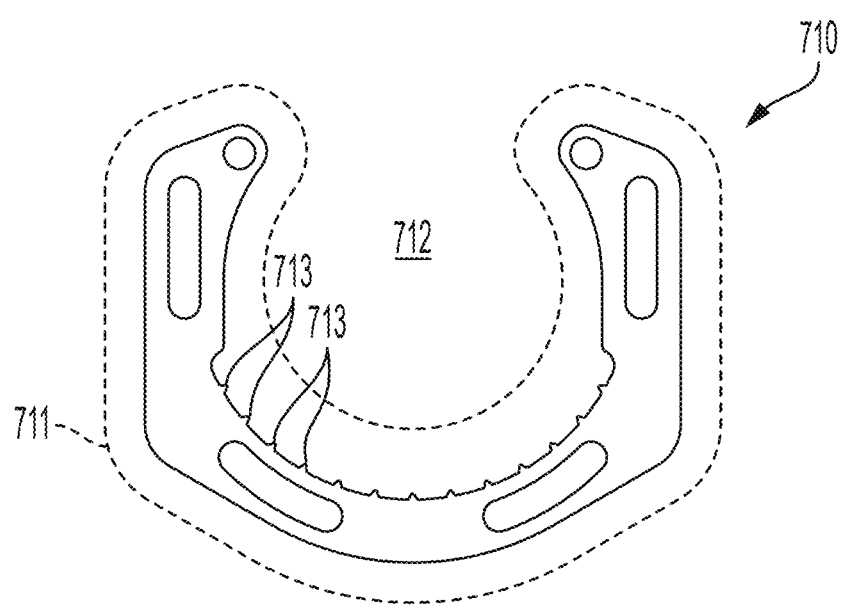
FIG. 11 is a front view of a perimeter plate for a toe adjustment mechanism.

FIG. 11 illustrates a front view of an exemplary embodiment of a perimeter plate (710) for a toe adjustment mechanism (700). As shown in FIG. 11, the perimeter plate may have a U-shaped profile (711).

Figure 12:
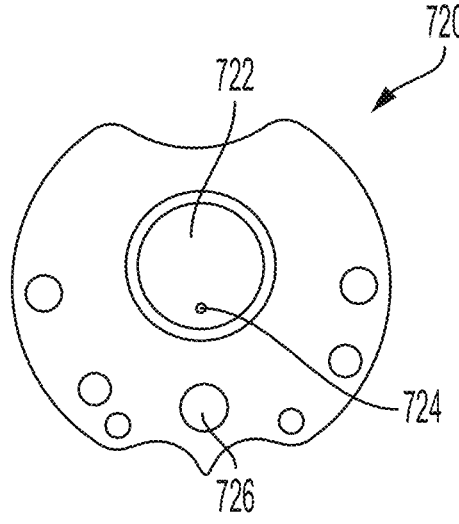
FIG. 12 is a front view of a cam plate for a toe adjustment mechanism.

FIG. 12 illustrates a front view of an exemplary embodiment of a cam plate (720) for a toe adjustment mechanism (700). As shown in FIG. 12, the cam plate may include a plate through hole (722). Preferably, the plate through hole will be offset from a plate central axis (724) to allow a cammed movement of the cam plate to adjust the toe of the wheel and tire assembly (20) as described herein. The cam plate may also include a pin (726) extending from a plate bottom surface ((728) as shown in FIG. 10).

The cammed movement of the cam plate (720) within the perimeter plate (710) differs from traditional cam and follower systems. Traditional cam and follower systems include a follower which slides on the outer edge of the cam and moves relative to the center as the cam rotates. In the devices described herein, the follower has been replaced with the perimeter plate which does not move relative to the hanger (100). Instead, the cam plate "floats" within the U-shaped profile interior of the perimeter plate and—in doing so—moves its own instantaneous center of rotation. The center moves exclusively along the line that connects the front and back (or top and bottom) points of contact with the guide plate.

Figure 13:
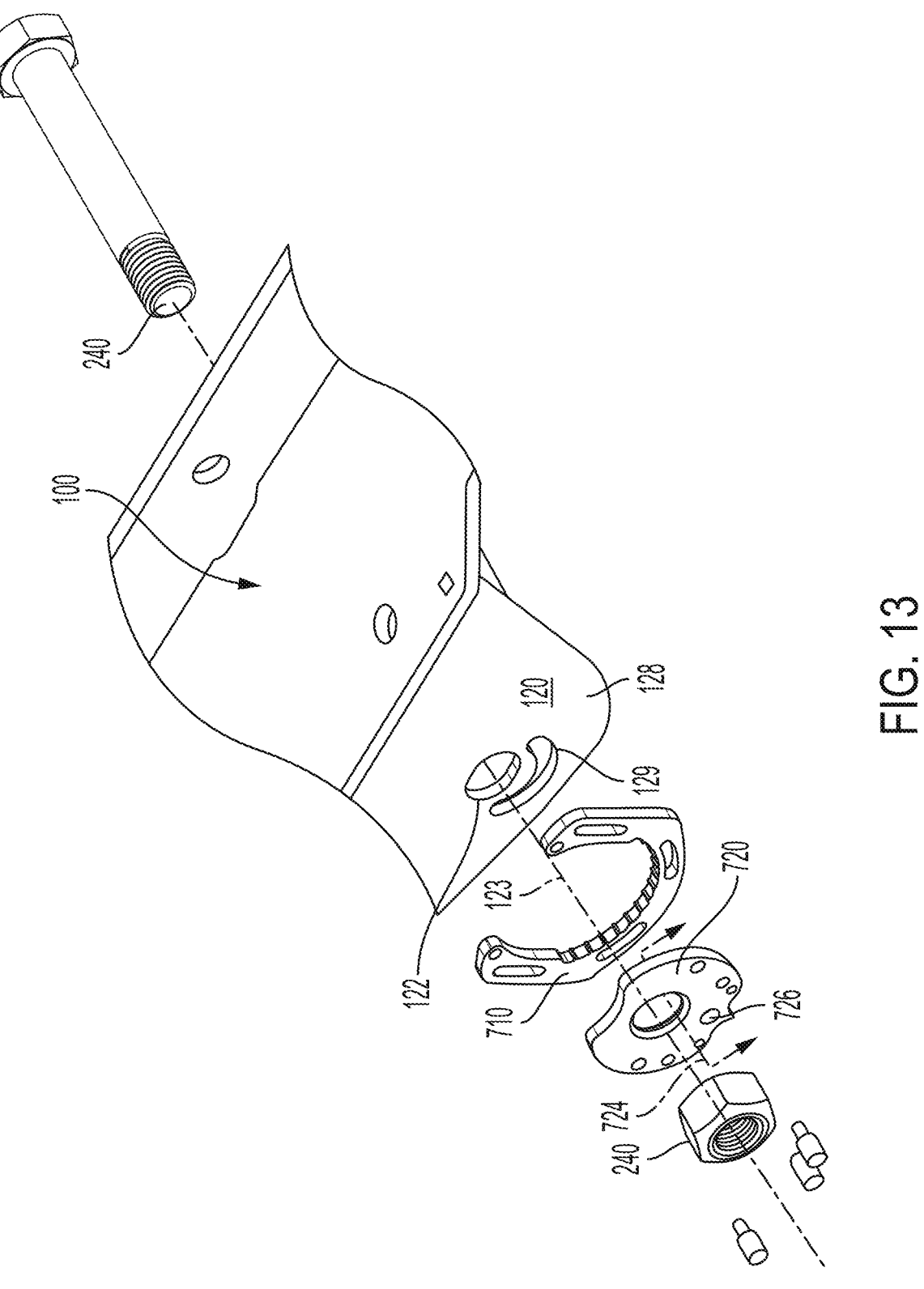
FIG. 13 is an exploded close-up view of a toe adjustment mechanism.

FIG. 13 illustrates an exploded perspective view of the toe adjustment mechanism (700) connecting to the hanger (100). As shown in FIG. 13, the toe adjustment mechanism is connected to the inboard plate (120) of the hanger. However, one of ordinary skill can easily envision where the toe adjustment mechanism can be connected to the outboard plate ((110) as shown in FIG. 3) of the hanger—with or without a camber adjustment mechanism (600)—instead.

As shown in FIG. 13, in the exemplary embodiment of a toe adjustment mechanism (700), the perimeter plate (710) may be attached to the inboard plate exterior surface (128) of the inboard plate (120) of the hanger (100). Preferably, when doing so, the second control arm connecting hole (122) will be located within a U-shaped profile interior ((712) as shown in FIG. 11) said U-shaped profile interior having a plurality of perimeter plate teeth ((713) as shown in FIG. 11) extending from an interior curved surface thereof as shown in FIG. 11. The attachment of the perimeter plate to the inboard plate exterior surface may take many forms. For example, the perimeter plate may be removably connected to the inboard plate exterior surface by one or more fasteners such as a bolt, screw, rivet, or the like. Alternatively, the perimeter plate may be permanently connected to the inboard plate exterior surface such as by welding the perimeter plate to the inboard plate exterior surface, or manufacturing the perimeter plate and the inboard plate of a single integral piece of material.

Figure 15A:
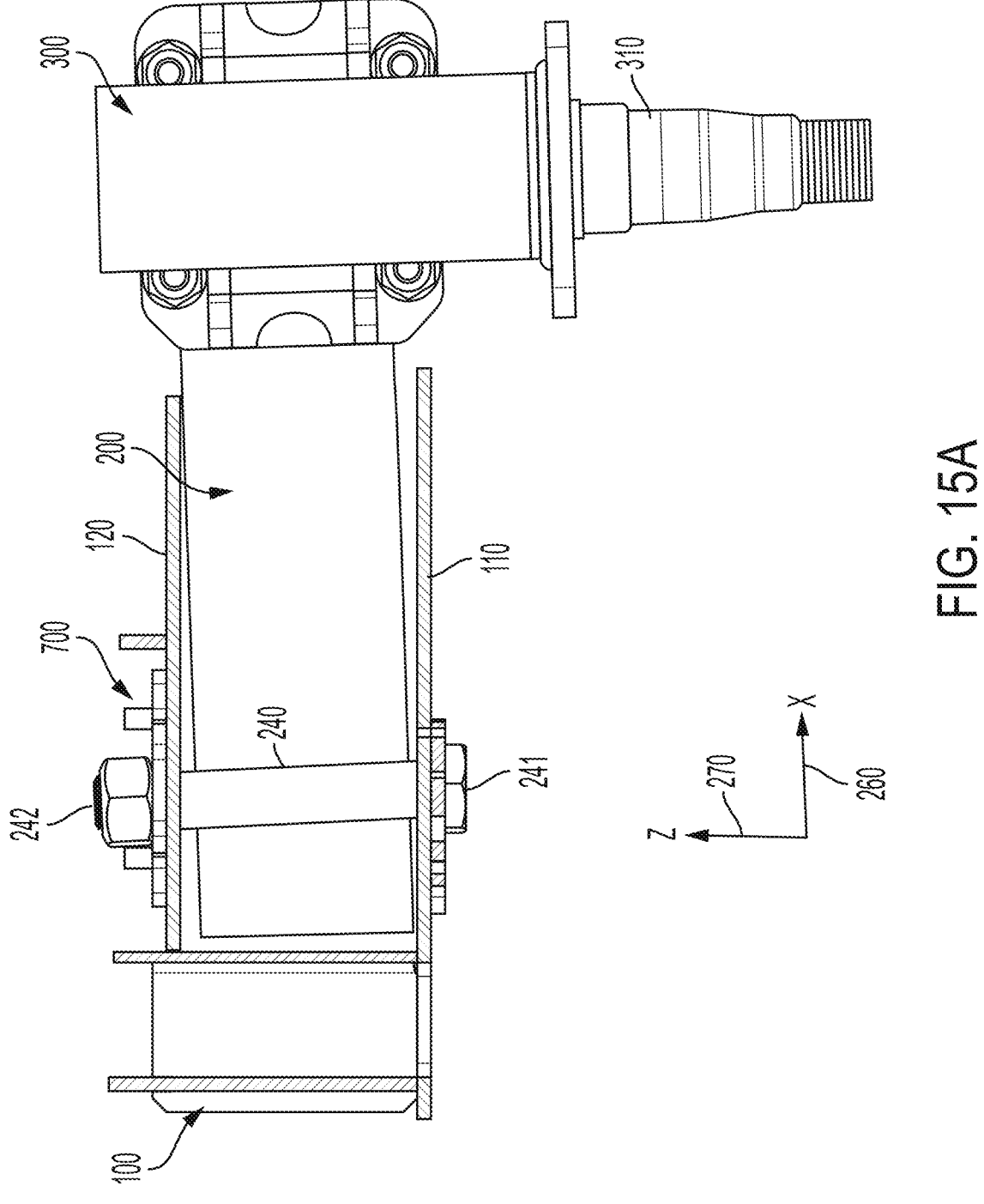
FIG. 15A is a cross section view of a toe adjustment mechanism connected to a suspension unit in a first position of toe adjustment.
Figure 16A:
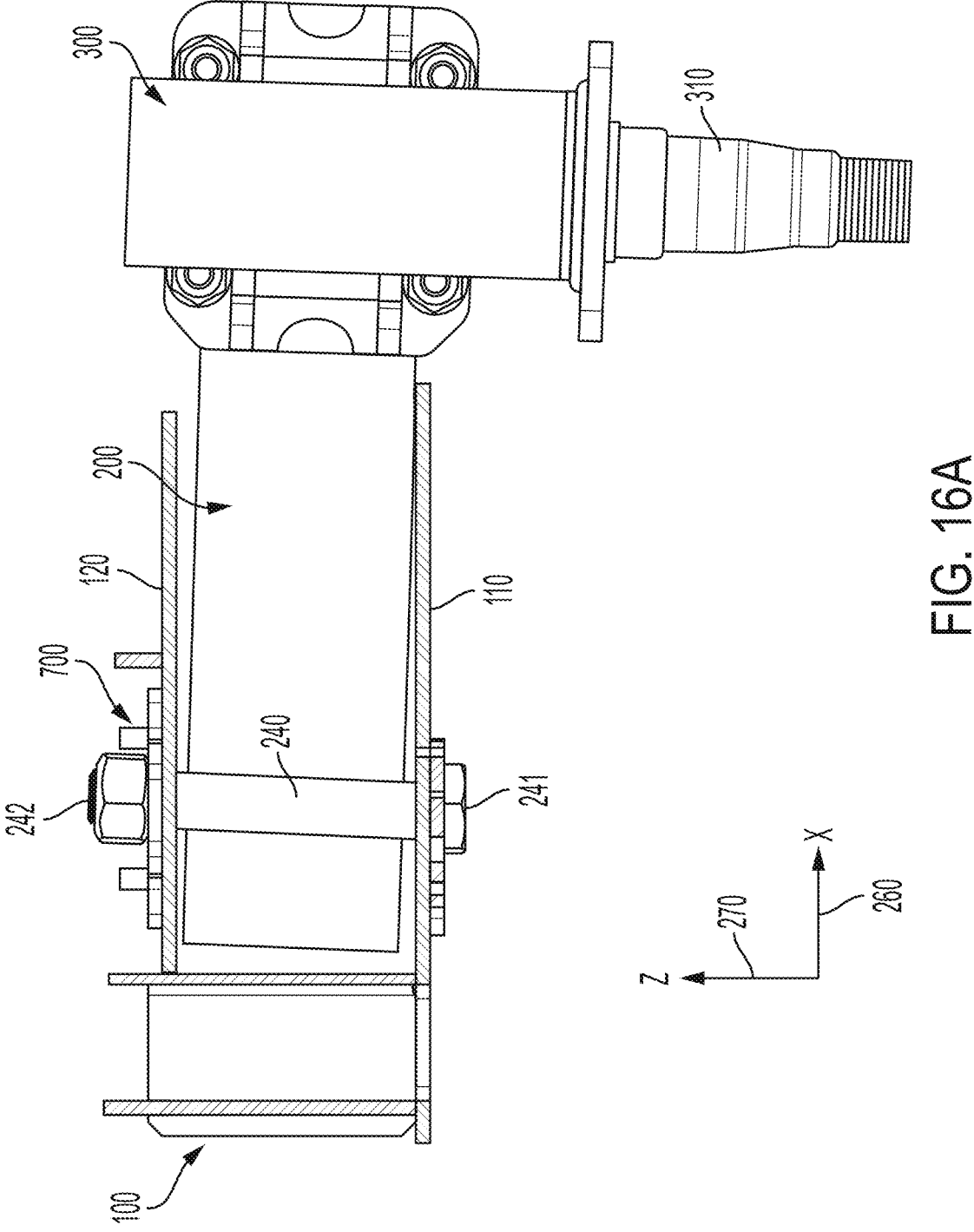
FIG. 16A is a cross section view of a toe adjustment mechanism connected to a suspension unit in a second position of toe adjustment.

Once the perimeter plate (710) is attached to the inboard plate exterior surface (128) of the inboard plate (120) of the hanger (100), the cam plate (720) may be placed within the U-shaped profile interior ((712) as shown in FIG. 11). At the same time, the pin (726) passes into a curved slot (129) in the inboard plate which may be located beneath the second control arm connecting hole (122). As the mounting bolt (240) connects the hanger (100) to the control arm (200), the mounting bolt second end (242) passes through the first control arm connecting hole (112), through the mounting stud ((230) as shown in FIG. 10), through the second control arm connecting hole (122), and then through the plate through hole (722) before a nut is threaded onto the mounting bolt second end. In the exemplary embodiment shown in FIG. 13, the second control arm connecting hole has a second horizontally oriented discorectangle shape (or "slot") allowing for the mounting bolt second end to move along the x-axis ((260) as shown in FIG. 15A and FIG. 16A) relative to the mounting bolt first end (241) to adjust the toe of the wheel and tire assembly (20) as further described herein. When the toe adjustment mechanism (700) is attached to the outboard plate exterior surface ((118) as shown in FIG. 3), it will be the first control arm connecting hole (112) that has a first horizontally oriented discorectangle shape (or "slot") allowing for the mounting bolt first end to move along the x-axis relative to the mounting bolt second end to adjust the toe of the wheel and tire assembly as further described herein.

Figure 14A:
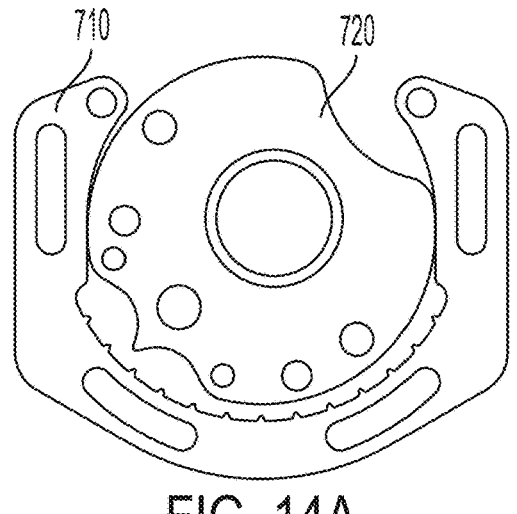
FIG. 14A is a front view of a cam plate within a perimeter plate in a first position.
Figure 14B:
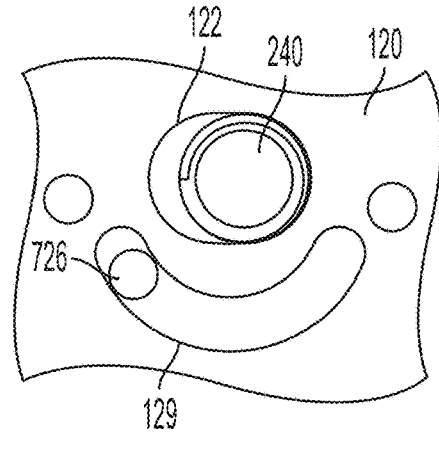
FIG. 14B is a view of a mounting bolt within a second control arm connecting hole of an inboard plate of a hanger when a cam plate is within a perimeter plate in the first position.
Figure 14C:
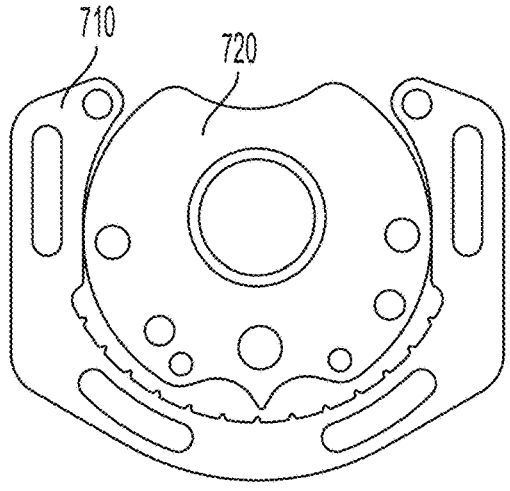
FIG. 14C is a front view of a cam plate within a perimeter plate in a second position.
Figure 14D:
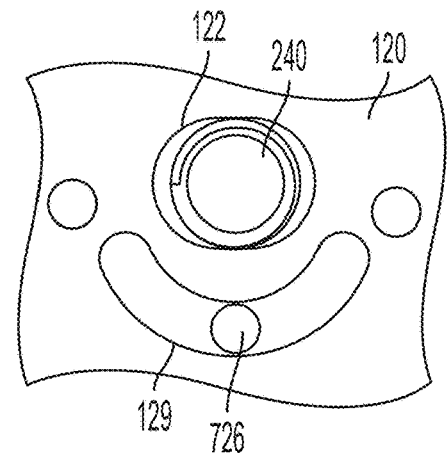
FIG. 14D is a view of a mounting bolt within a second control arm connecting hole of an inboard plate of a hanger when a cam plate is within a perimeter plate in the second position.
Figure 14E:
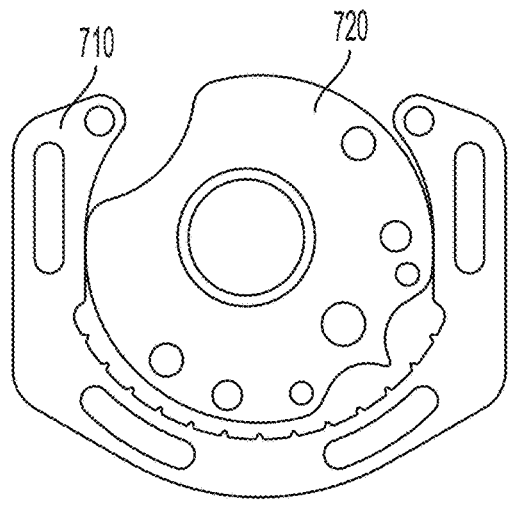
FIG. 14E is a front view of a cam plate within a perimeter plate in a third position.
Figure 14F:
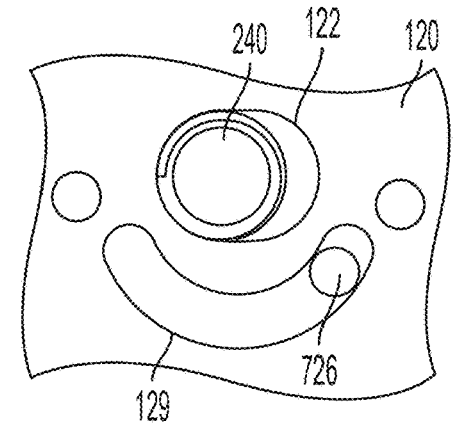
FIG. 14F is a view of a mounting bolt within a second control arm connecting hole of an inboard plate of a hanger when a cam plate is within a perimeter plate in the third position.
Figure 15B:
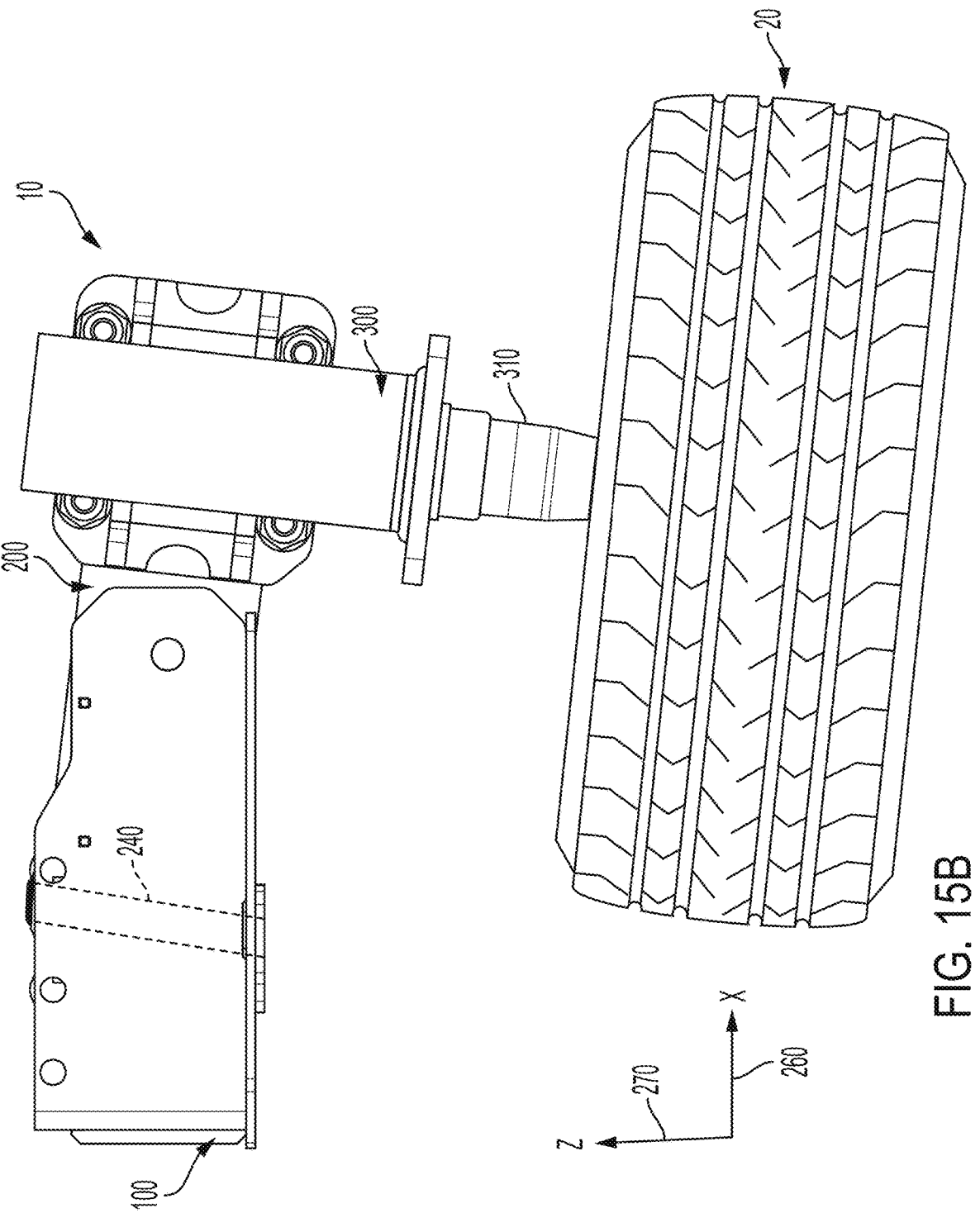
FIG. 15B is a rear view of a wheel and tire assembly in the first position of toe adjustment.

FIG. 14A through FIG. 14F illustrate the cammed motion of the cam plate (720) within the perimeter plate (710) to change the position of the mounting bolt second end (242) along the x-axis ((260) as shown in FIG. 15A and FIG. 16A). As shown in FIG. 14A and FIG. 14B, when the mounting bolt is loosened and the cam plate is rotated clockwise, the mounting bolt second end moves to the right within the second control arm connecting hole (122) placing the wheel and tire assembly in a position of toe out as shown in FIG. 15B. In FIG. 14C and FIG. 14D, the mounting bolt is loosened and the cam plate is rotated counterclockwise to a neutral position causing the mounting bolt second end to move to a central location within the second control arm connecting hole and placing the wheel and tire assembly in a position of neutral toe. In FIG. 14E and FIG. 14F, the mounting bolt is loosened and the cam plate is rotated further counterclockwise causing the mounting bolt second end to move to the left within the second control arm connecting hole and placing the wheel and tire assembly in a position of toe in as shown in FIG. 16B.

Figure 16B:
FIG. 16B is a rear view of a wheel and tire assembly in the second position of toe adjustment.

FIG. 15A through FIG. 16B illustrate how the exemplary embodiment of the toe adjustment mechanism (700) operates to adjust the toe of a wheel and tire assembly (20). FIG. 15A and FIG. 16A illustrate cross section views of the suspension unit (10) from the top down in two different positions which correspond to two different positions of toe adjustment. FIG. 15B and FIG. 16B illustrate top down views of the suspension unit with the wheel and tire assembly (20) connected to the spindle assembly (300).

In FIG. 15A and FIG. 15B, the mounting bolt (240) has been loosened, and the cam plate ((720) as shown in FIG. 13) has been rotated about the plate central axis ((724) as shown in FIG. 13) until the plate through hole ((722) as shown in FIG. 13) is in a forward position before tightening the mounting bolt. In doing so, the mounting bolt second end (242) moves forward along the x-axis (260) within the second control arm connecting hole ((122) as shown in FIG. 13) having the horizontally oriented discorectangle shape (or "slot") while the mounting bolt first end (241) remains in largely its original position along the x-axis. This causes the upper wall ((220) as shown in FIG. 10) of the control arm (200) to pivot along the x-axis (260) in the direction of the z-axis (270) within the interior channel between the outboard plate (110) and the inboard plate (120) of the hanger (100). The pivoting of the upper wall transfers through to the spindle assembly (300)—which is mounted to the upper wall top surface ((224) as shown in FIG. 10) at the upper wall proximal end ((222) as shown in FIG. 10)—which acts upon the wheel and tire assembly (20) to place the wheel and tire assembly in a position of toe out as shown in FIG. 15B.

In FIG. 16A and FIG. 16B, the mounting bolt (240) has been loosened, and the cam plate ((720) as shown in FIG. 13) has been rotated about the plate central axis ((724) as shown in FIG. 13) until the plate through hole ((722) as shown in FIG. 13) is in a rearward position before tightening the mounting bolt. In doing so, the mounting bolt second end (242) moves rearward along the x-axis (260) within the second control arm connecting hole ((122) as shown in FIG. 13) having the horizontally oriented discorectangle shape (or "slot") while the mounting bolt first end (241) remains in largely its original position along the x-axis. This causes the upper wall ((220) as shown in FIG. 10) of the control arm (200) to pivot along the x-axis (260) in the direction of the z-axis (270) within the interior channel between the outboard plate (110) and the inboard plate (120) of the hanger. The pivoting of the upper wall transfers through to the spindle assembly (300)—which is mounted to the upper wall top surface ((224) as shown in FIG. 10) at the upper wall proximal end ((222) as shown in FIG. 10)—which acts upon the wheel and tire assembly (20) to place the wheel and tire assembly in a position of toe in as shown in FIG. 16B.

While FIGS. 15A through 16B show the exemplary embodiment of the toe adjustment mechanism (700) moving the wheel and tire assembly (20) between a position of toe out (as shown in FIGS. 15A and 15B) and toe in (as shown in FIGS. 16A and 16B), the toe adjustment mechanism allows for any number of different toe adjustment positions including toe in, neutral toe, and toe out. The amount of toe adjustment permitted will largely depend upon the size and shape of the second control arm connecting hole (122), the U-shaped profile interior (712) of the perimeter plate (710), and the cam plate (720) as well as the location of the plate through hole (722) relative to the plate central axis (724) and the length and diameter of the mounting bolt (240). Preferably, the toe adjustment mechanism will allow for toe adjustments in a range selected from the group consisting of between −3.0° and 3.0°, between −2.5° and 2.5°, between −2.0° and 2.0°, between −1.5° and 1.5°, and between −1.0° and 1.0°.

The suspension units described herein allow a user or installer to adjust the alignment of an axle-free suspension system—particularly for a trailer—without the need to completely remove all or a portion of the suspension system from the frame. Camber may be adjusted by loosening the mounting bolt and utilizing the camber adjustment mechanism to rotate the mounting bolt along the y-axis as described herein before retightening the mounting bolt. Similarly, toe may be adjusted by loosening the mounting bolt and utilizing the toe adjustment mechanism to pivot the mounting bolt along the x-axis as described herein before retightening the mounting bolt.

While the invention has been described as having exemplary designs, the present invention may be further modified within the spirit and scope of this disclosure. This application is therefore intended to cover any variations, uses, or adaptations of the invention using its general principles.

What is claimed is:

1. A suspension unit (10) for suspending a wheel and tire assembly (20) from a vehicle frame, said suspension unit comprising:

a hanger (100) having an outboard plate (110) comprising a first control arm connecting hole (112), an inboard plate (120) comprising a second control arm connecting hole (122), a top wall (130) connecting between an outboard plate upper edge (114) and an inboard plate upper edge (124), and a front wall (140) connecting between an outboard plate leading edge (116) and an inboard plate leading edge (126);

a control arm (200) having a forward wall (210) connected to an upper wall (220), with a mounting stud (230) connected to an upper wall proximal end (222);

a spindle assembly (300) connected to an upper wall top surface (224) at an upper wall terminal end (226);

a jounce spring (400) positioned between the upper wall top surface and a top wall bottom surface (132);

a rebound spring (500) positioned between a forward wall outer surface (212) and a front wall inner surface (142);

a camber adjustment mechanism (600); and a toe adjustment mechanism (700); and wherein a mounting bolt (240) connects the control arm to the hanger by passing through the first control arm connecting hole, the mounting stud, and the second control arm connecting hole, the camber adjustment mechanism is configured to change a first position of a mounting bolt first end (241) along a z-axis (250) relative to a second position of a mounting bolt second end (242) along the z-axis, and the toe adjustment mechanism is configured to change a third position of the mounting bolt first end or the mounting bolt second end along an x-axis (260) relative to a fourth position of an opposing mounting bolt end along the x-axis.

2. The suspension unit of claim 1, wherein the camber adjustment mechanism comprises:

a guide plate (610) having a C-shaped profile (611), said guide plate being attached to an outboard plate exterior surface (118) or an inboard plate exterior surface (128) with the first control arm connecting hole located within a C-shaped profile interior (612) when the guide plate is connected to the outboard plate exterior surface, and the second control arm connecting hole located within the C-shaped profile interior when the guide plate is connected to the inboard plate exterior surface; and a profile disk (620) located within the C-shaped profile interior, said profile disk having a disk through hole (622) offset from a disk central axis (624); and wherein the first control arm connecting hole has a first vertically oriented discorectangle shape when the guide plate is attached to the outboard plate exterior surface, the second control arm connecting hole has a second vertically oriented discorectangle shape when the guide plate is attached to the inboard plate exterior surface, and the mounting bolt passes through the disk through hole.

3. The suspension unit of claim 2, wherein the toe adjustment mechanism comprises:

a perimeter plate (710) having a U-shaped profile (711), said perimeter plate being attached to the outboard plate exterior surface or the inboard plate exterior surface with the first control arm connecting hole located within a U-shaped profile interior (712) when the perimeter plate is connected to the outboard plate exterior surface, and the second control arm connecting hole located within the U-shaped profile interior when the perimeter plate is connected to the inboard plate exterior surface; and a cam plate (720) located within the U-shaped profile interior, said cam plate having a plate through hole (722) offset from a plate central axis (724), and a pin (726) extending from a plate bottom surface (728); and wherein the mounting bolt passes through the plate through hole, when the perimeter plate is attached to the outboard plate exterior surface, the first control arm connecting hole is has a first horizontally oriented discorectangle shape, and the outboard plate includes a first curved slot through which the pin passes, and when the perimeter plate is attached to the inboard plate exterior surface, the second control arm connecting hole has a second horizontally oriented discorectangle shape, and the inboard plate includes a second curved slot (129) through which the pin passes.

4. The suspension unit of claim 3, wherein the control arm and the hanger are configured such that the jounce spring and the rebound spring are compressed and relaxed simultaneously in substantially opposite directions.

5. The suspension unit of claim 2, wherein the jounce spring is made of a first elastomeric polymer material.

6. The suspension unit of claim 2, wherein the rebound spring is made of a second elastomeric polymer material.

7. The suspension unit of claim 2, wherein the jounce spring is preloaded such that the jounce spring is under compression when the control arm is at rest.

8. The suspension unit of claim 2, wherein the rebound spring is preloaded such that the rebound spring is under compression when the control arm is at rest.

9. The suspension unit of claim 1, wherein the toe adjustment mechanism comprises:

a perimeter plate (710) having a U-shaped profile (711), said perimeter plate being attached to an outboard plate exterior surface (118) or an inboard plate exterior surface (128) with the first control arm connecting hole located within a U-shaped profile interior (712) when the perimeter plate is connected to the outboard plate exterior surface, and the second control arm connecting hole located within the U-shaped profile interior when the perimeter plate is connected to the inboard plate exterior surface; and a cam plate (720) located within the U-shaped profile interior, said cam plate having a plate through hole (722) offset from a plate central axis (724), and a pin (726) extending from a plate bottom surface (728); and wherein the mounting bolt passes through the plate through hole, when the perimeter plate is attached to the outboard plate exterior surface, the first control arm connecting hole has a first horizontally oriented discorectangle shape, and the outboard plate includes a first curved slot through which the pin passes, and when the perimeter plate is attached to the inboard plate exterior surface, the second control arm connecting hole has a second horizontally oriented discorectangle shape, and the inboard plate includes a second curved slot (129) through which the pin passes.

10. The suspension unit of claim 9, wherein the jounce spring is made of a first elastomeric polymer material.

11. The suspension unit of claim 9, wherein the rebound spring is made of a second elastomeric polymer material.

12. The suspension unit of claim 9, wherein the jounce spring is preloaded such that the jounce spring is under compression when the control arm is at rest.

13. The suspension unit of claim 9, wherein the rebound spring is preloaded such that the rebound spring is under compression when the control arm is at rest.

14. The suspension unit of claim 1, wherein the jounce spring is made of a first elastomeric polymer material.

15. The suspension unit of claim 1, wherein the rebound spring is made of a second elastomeric polymer material.

16. The suspension unit of claim 1, wherein the control arm and the hanger are configured such that the jounce spring and the rebound spring are compressed and relaxed simultaneously in substantially opposite directions.

17. The suspension unit of claim 1, wherein the jounce spring is preloaded such that the jounce spring is under compression when the control arm is at rest.

18. The suspension unit of claim 1, wherein the rebound spring is preloaded such that the rebound spring is under compression when the control arm is at rest.

* * * * *